S. JOHNSTONE.
AUTOMOBILE CUSHION WHEEL.
APPLICATION FILED APR. 6, 1917.

1,258,573.

Patented Mar. 5, 1918.

Inventor:
Samuel Johnstone
by
Atty.

UNITED STATES PATENT OFFICE.

SAMUEL JOHNSTONE, OF ST. CATHARINES, ONTARIO, CANADA.

AUTOMOBILE CUSHION-WHEEL.

1,258,573.

Specification of Letters Patent.

Patented Mar. 5, 1918.

Application filed April 6, 1917. Serial No. 160,232.

*To all whom it may concern:*

Be it known that I, SAMUEL JOHNSTONE, of the city of St. Catharines, in the county of Welland, in the Province of Ontario, Canada, have invented certain new and useful Improvements in Automobile Cushion-Wheels, of which the following is the specification.

My invention relates to improvements in automobile cushion wheels and the object of the invention is to devise a cheap, durable wheel having a maximum resilience, which will be no heavier than any other wheel of this class commonly used and the tread portion of which may be readily renewed after being worn out and it consists essentially of a wheel hub, tread and intermediate connection portion formed integral with a shock absorbing structure as hereinafter more particularly explained.

In the drawings like numerals of reference indicate corresponding parts in the various figures.

Figure 1:
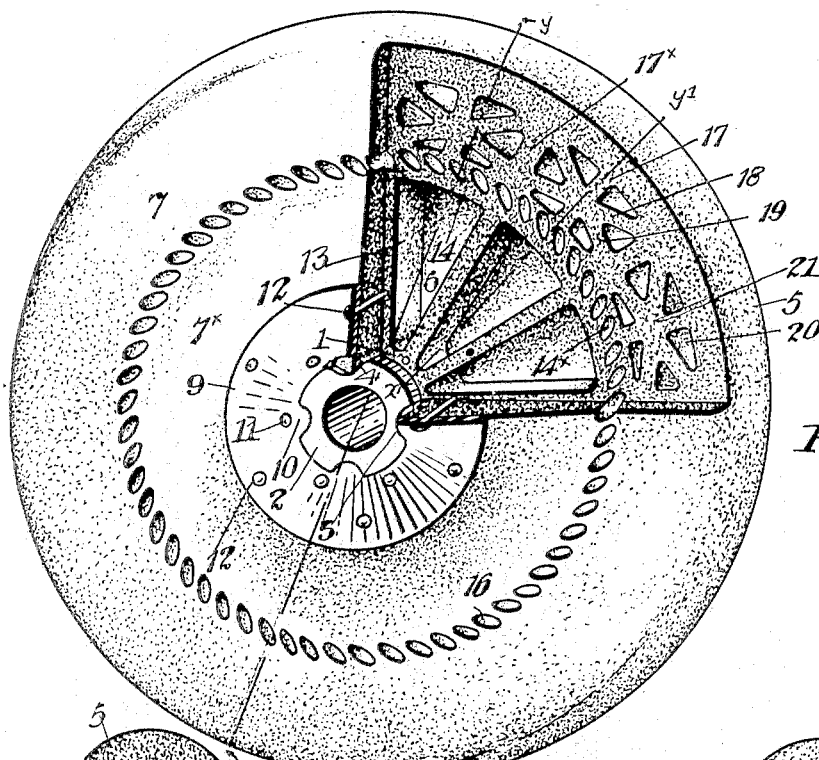
Figure 1, represents a general perspective view of my wheel partially broken away and in section to exhibit the interior construction thereof.
Figure 2:
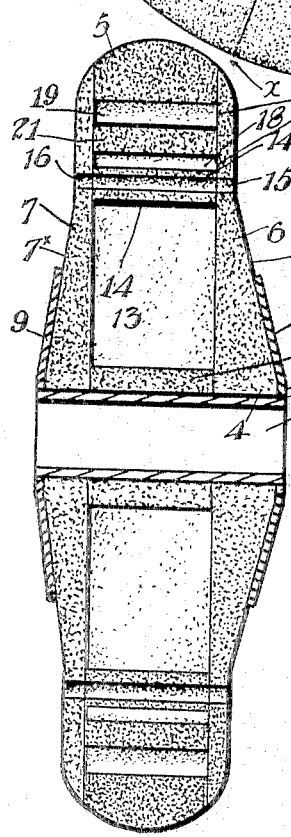
Fig. 2, is a transverse section taken on line $x$—$y$ Fig. 1.

1 indicates the central or hub portion of a wheel which surrounds a metal bearing sleeve 2, such sleeve being provided with indentations 3 into which corresponding projecting portions 4 of the hub extend.

Although I have shown this form of connection between the hub and bearing sleeve it will, of course, be understood that any other suitable form of connection may be employed.

The wheel comprises a center portion extending directly radially from the hub portion 1 terminating at its outer periphery in the tread portion 5, 6 and 7 indicate disks built up of rubber placed at each side of the center portion of the tire and vulcanized thereto, the central portions of the disks 6 and 7 preferably flaring outwardly around the center at $6^x$ and $7^x$ to counterbalance any lateral thrust on the wheel.

8 and 9 indicate plates which extend around the ends of the sleeve 2 and are provided with inwardly projecting portions 10 fitting into the grooves 3 hereinbefore described of the sleeve 2. 11 and 12 indicate bolts, which are suitably arranged and extend through the plates 8 and 9 and central portion of the wheel extending around the hub 1. From the center hub 1 extend spoke portions 13, which are integral with the hub. Between the ends of the spokes 13 and the tread portion 5 is located a shock absorbing portion 14, which is formed integral with the spokes. Formed in the inner portion of the shock absorbing portion 14 is an annular series of orifices $14^x$, such orifices being set transversely and slightly overlapping one another. The disks 6 and 7 are also provided with similar orifices 15 and 16 in alinement with the orifices $14^x$ and corresponding in form thereto.

The shock absorbing portion 14 includes radial webs 17 and diagonal webs 18 and 19 intersecting each radial web 17 and formed integral therewith, the ends of the diagonal webs merging at their ends into interposed radial webs $17^x$. By this means a series of triangular orifices 20 are formed in the center portion of the tire, such orifices being arranged around a center core 21 formed by the intersections of the webs.

In building up the tire the central or hub portion 1 is built up separately, such central portion being preferably formed of very cheap rubber such as reclaimed rubber. This center portion may be formed with spoke-like portions 13 as above described, through which extend the orifices $14^x$.

Figure 3:
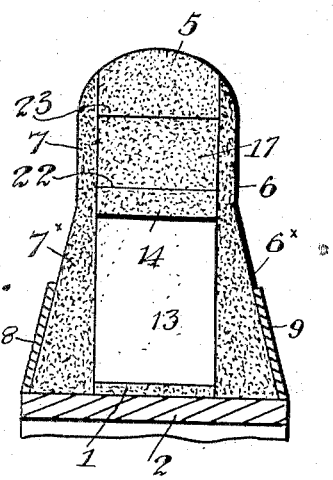
Fig. 3, is a partial section taken on line $x'$—$y'$ Fig. 1.

The shock absorbing portion of the tire extending between the center portion of the wheel and the tread portion 5 is built up separately and inserted in the mold around the center portion 1 directly to the outside of that portion of the center portion having the orifices $14^x$, the dividing line between the shock absorbing portion and the center portion being represented by the cross line 22 in Fig. 3, and the dividing line between the shock absorbing portion and the tread portion being represented by the cross line 23 in Fig. 3. The tread portion 5 is also built up separately and placed in the mold around the shock absorbing portion.

It will, of course, be understood that prior to the insertion in the mold of the center portion the shock absorbing portion and tread portion one disk 6 is built up in the bottom of the mold and the center shock absorbing portion and tread portion of the wheel laid thereon. The other side of the wheel formed by the disk 7 is then built up upon the top of the center portion of the wheel and the whole vulcanized together so as to form one integral unit, which is formed completely of reinforced rubber.

It will be readily seen that when this wheel is in use that should the tread portion of the tire be worn away all that it is necessary to do in order to repair such wheel is to vulcanize a new tread portion thereon.

From this description it will be seen that I have devised a very simple durable wheel, which will have a maximum resilience, which will be substantially rigid against any side thrust, the tread portion of which may be easily and quickly repaired thereby making the body of the wheel of unlimited durability, which will have no greater weight than the usual wood or metal wheels, which provides a wheel which will require no assembling, and which eliminates the use of practically all metal parts working in contact with the rubber, and which is so destructive in solid rubber and pneumatic tires where used in fastening a pneumatic or rubber tire to a wooden felly.

It will, of course, be understood that although I have shown a tread partially circular in cross section, I do not intend to be limited to this.

It will be noticed that in Fig. 3 the lines 22 and 23 shown are merely imaginary lines indicating where the division between the separated pieces occurs before they are vulcanized together. When they are vulcanized together they form one unit as indicated in Fig. 1, therefore showing no division line. When the parts are built up prior to vulcanizing they are in separate parts as indicated by lines in Fig. 3. These lines are only chosen in order to show how the tire is built up.

What I claim as my invention is.

1. An automobile cushion wheel comprising a central portion of resilient material, an outer resilient tread portion, and an interposed shock absorbing portion comprising a plurality of crossed webs of resilient material formed with the center and tread portions.

2. An automobile cushion wheel comprising a center portion of resilient material, an outer resilient tread portion, and an interposed shock absorbing portion comprising a series of spaced apart radial webs extending crosswise of the tread, and crossed webs intersecting each alternate radial web, and merging at their ends into the intervening radial web and formed with the center and tread portions.

3. An automobile cushion wheel comprising a center portion formed of resilient material, an outer tread portion formed of resilient material, and an interposed shock absorbing portion formed with the center and tread portions and having an annular series of orifices extending transversely through the outer part of the center portion and overlapping one over the other.

4. An automobile cushion wheel comprising a center hub portion, a tread portion, an interposed shock absorbing portion, and side plate members fitting against the sides of the hub, tread and shock absorbing portions all formed of resilient material.

5. An automobile cushion wheel comprising a center hub portion, a tread portion, an interposed shock absorbing portion, and side plate members fitting against the sides of the hub, tread and shock absorbing portions all formed of rubber vulcanized together.

6. An automobile cushion wheel comprising a center hub portion, a tread portion, an interposed shock absorbing portion, and side plate members fitting against the sides of the hub, tread and shock absorbing portions having the center portions thereof extending outwardly in conical form and all formed of resilient material.

SAMUEL JOHNSTONE.

Witnesses:
R. W. KNIGHT,
JEAN WILLS.